Dec. 8, 1925.
E. M. MAYER
1,565,023
CHILD'S VEHICLE
Original Filed Sept. 12, 1924    2 Sheets-Sheet 1
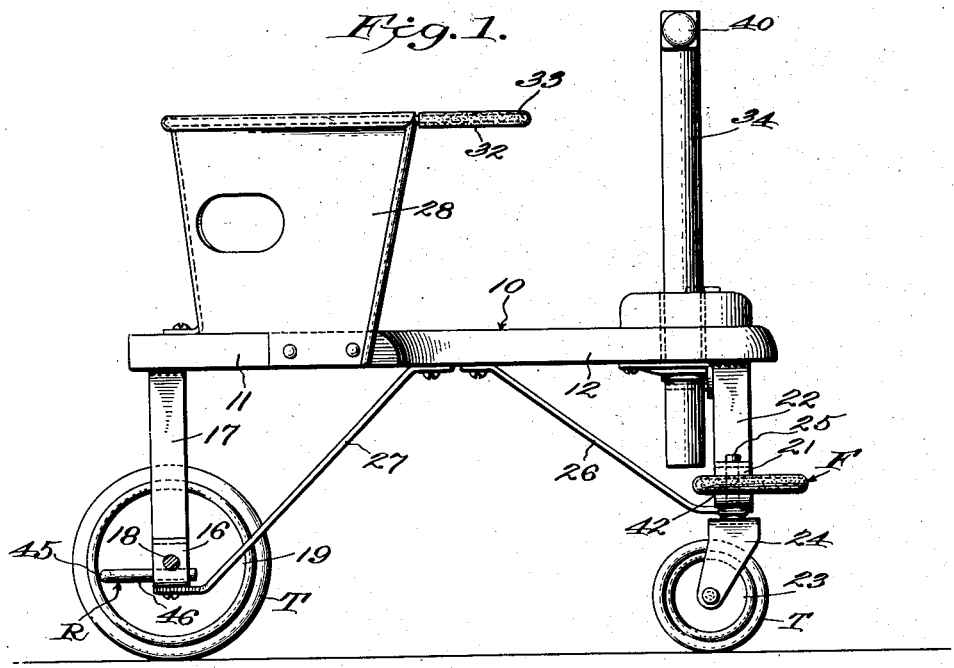
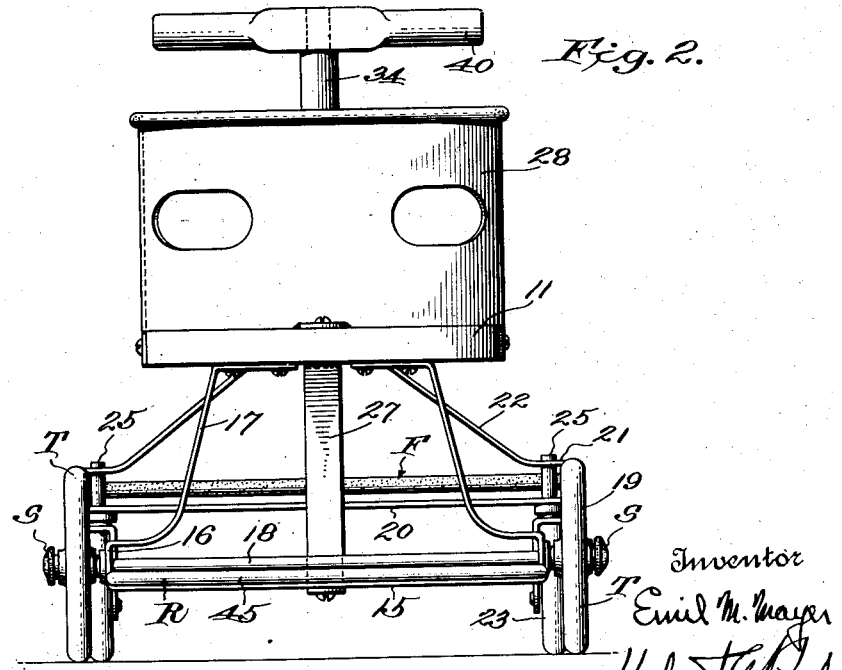
Inventor
Emil M. Mayer
Hubert E. Peck
Attorney

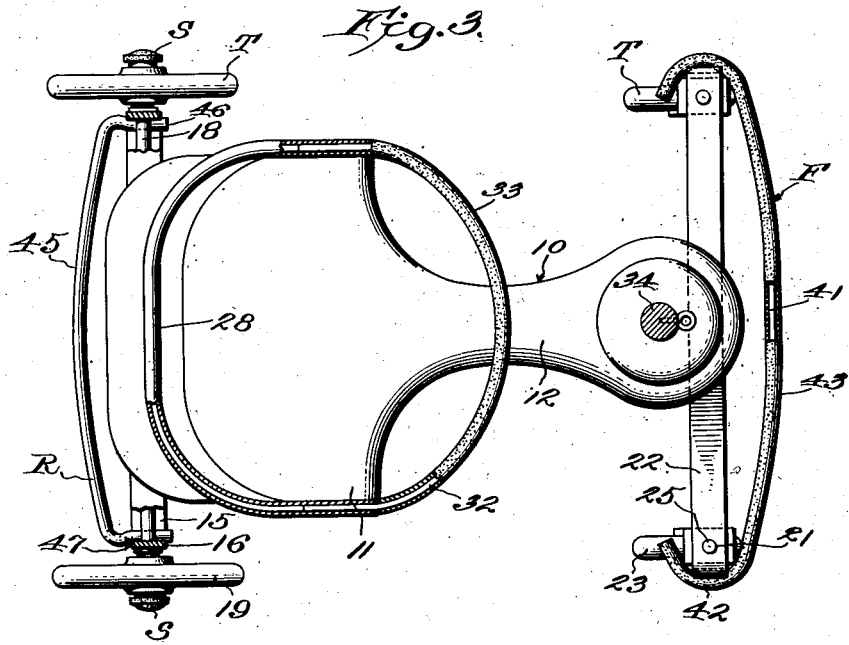
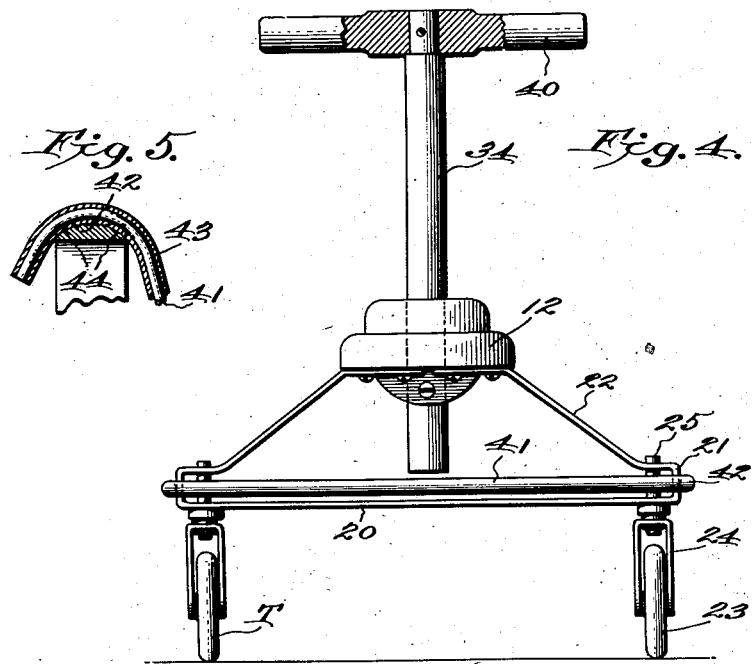

Patented Dec. 8, 1925.

1,565,023

UNITED STATES PATENT OFFICE.

EMIL M. MAYER, OF CINCINNATI, OHIO, ASSIGNOR TO NEWPORT MANUFACTURING COMPANY, OF NEWPORT, KENTUCKY, A CORPORATION OF KENTUCKY.

CHILD'S VEHICLE.

Original application filed September 12, 1924, Serial No. 737,307. Divided and this application filed July 27, 1925. Serial No. 46,309.

*To all whom it may concern:*

Be it known that I, EMIL M. MAYER, a citizen of the United States of America, and resident of Cincinnati, county of Hamilton, State of Ohio, have invented certain new and useful Improvements in and Relating to Children's Vehicles, set forth in the annexed specification, being a division of my pending U. S. Patent application filed September 12, 1924, Serial No. 737,307.

This invention relates to certain improvements in children's vehicles; and the nature and objects of the invention will be readily recognized and understood by those skilled in the arts involved in the light of the following explanation and detailed description of the accompanying drawings illustrating what I now believe to be the preferred embodiments or mechanical expressions of the invention from among various other forms, arrangements, combinations and constructions of which the invention is capable within the spirit and scope thereof.

The invention is primarily directed to a child's vehicle of the type adapted to carry and be propelled by a child seated thereon, although the invention and the several features thereof are applicable to other types of children's or other vehicles. Children's vehicles, and particularly those of the above mentioned types, are used indoors a considerable part of the time, as well as being usually stored indoors when not in use, and it is found that considerable damage to furniture, woodwork, and the like, frequently results from being struck or engaged by projecting portions of the vehicle, which scratch, gouge, or otherwise mar the objects so struck. This is mainly occasioned by the front and rear portions of the vehicle and by the projecting axle ends, as will be readily apparent to those familiar with these vehicles.

Therefore, one of the main objects of the invention is to eliminate the possibility of such vehicles injuring adjacent objects, through striking or engaging the same, by providing the vehicles with protecting elements at portions thereof liable to engage an adjacent object, which elements are formed of such materials and so constructed and mounted on the vehicle as to not damage an object engaged thereby.

A further object of the invention is to provide a child's vehicle with front and rear bumpers detachably mounted on and supported from the vehicle frame and projecting outwardly beyond the vehicle structure to prevent the same from striking adjacent objects, and which bumpers are formed with a contact surface which will not scratch or otherwise mar an object struck or engaged thereby.

A further object of the invention is to provide a child's vehicle with rubber or other soft material protecting elements at points on the vehicle liable to engage or strike adjacent objects by a vehicle in use, and which elements are so constructed as to be mounted on and supported from the vehicle structure without major structural change in the vehicle.

Another object of the invention is to provide a vehicle of the foregoing general types, which is of simple but strong construction affording the maximum of attractiveness and of comfort to a child therein, and easily propelled by the child with a minimum of effort.

With the foregoing general objects, and certain other objects and results in view, which other objects and results will be readily apparent to those familiar with this art from the following description, the invention consists in certain novel features in construction and in combinations and arrangements of elements, as will be more fully and particularly referred to and specified hereinafter.

Referring to the accompanying drawings, in which similar reference characters indicate corresponding elements throughout:

Fig. 1 is a view in side elevation of a child's vehicle embodying the several features of the invention.

Fig. 2 is a view in rear elevation of the vehicle of Fig. 1.

Fig. 3 is a view in top plan of the vehicle of Fig. 1.

Fig. 4 is a view in front elevation of the forward frame and wheels with the bumper thereon, and showing the steering or hand post of the vehicle.

Fig. 5 is a detail fragmentary view, partly in section, of the construction of the front bumper and forward wheel frame, showing the manner of mounting and locking the bumper on the frame in mounted applied position.

One possible form and embodiment of a vehicle presenting the principles and various features of the invention is illustrated in the accompanying drawings and described herewith purely by way of example and not of limitation, for the purpose of explaining the invention so that the same will be readily understood by those skilled in this art. Certain features of the invention are not confined or limited to the specific type or form of vehicle disclosed, but are applicable to use with and embodiment in vehicles generally, as will appear from the following explanation of the various features of the invention in the form and application thereof, of the present example.

In the illustrated form of the invention, the child's vehicle of the type hereinbefore referred to, embodies the substantially flat body or bed 10 having the relatively wide rear portion forming the seat 11, and the relatively narrow or reduced portion 12 extending centrally and forwardly therefrom in longitudinal continuation thereof.

The vehicle body or bed 10, so formed, is mounted and supported upon wheels carried by front and rear supporting frames on which the body or bed is secured. The rear frame of the vehicle embodies a transversely disposed lower bar 15 having the opposite ends thereof bent upwardly to provide the axle receiving and mounting members 16, and then extended inwardly and upwardly to form the frame side members 17 secured at their upper ends to the body 10 adjacent the rear end of seat 11. Thus, the rear frame is disposed transversely across and depends from the under side of seat 11 to form a support therefor, as will be clear by reference to Figs. 1 and 2 of the drawings in particular. A rear axle 18 is mounted in the opposite members 16 of the rear frame and extends across and above the lower bar 15 of the frame, and outwardly a distance beyond the members 16, respectively. Rear wheels 19 are mounted on the opposite extended ends of the axle 18, and are confined and maintained thereon in the usual or any other desired manner. It will here be noted that the lower end of the rear frame, including the lower frame bar 15, is of greater width than the width of the seat portion 11 of the vehicle body 10, and extends outwardly beyond the seat, so that the rear wheels 19 are disposed below the seat 11 and spaced outwardly from opposite sides thereof. (See Figs. 2 and 3.)

The front frame of the vehicle for supporting the forward reduced or narrow portion 12 of the body or bed 10, is of a type similar to the rear frame above described and embodies the lower transversely disposed cross bar or rod 20 turned upwardly and then inwardly a distance at the opposite ends thereof to provide members 21 for receiving and mounting the front wheel assemblies. The inwardly turned portions of the frame members 21 are extended inwardly and upwardly to and secured at their upper ends on and to the lower or under side of the forward end of the vehicle body or bed 10, in any suitable manner, and form the frame side members 22. The front frame is of less height or depth than the rear frame, due to the type of front wheel and the mounting thereof employed, which necessitates such formation of the front frame in order to maintain the body 10 in the desired substantially horizontally disposed position. Front wheel assemblies of the swivel or castor type are mounted at opposite ends of the front frame in position depending therefrom, and embody the wheels 23 of relatively large diameter mounted in the forks 24 which are swivelled or rotatably mounted on the lower ends of the pins or stub shafts 25 which are secured and mounted in vertically disposed position extending upwardly through the opposite end frame members 21, respectively. In mounted position the front wheels 23 are disposed beneath opposite ends of the front frame and are freely rotatable or swingable around and on vertical axes formed by the pins or stub shafts 25 mounted in the frame. The vehicle so formed with the body or bed 10 mounted on and supported by the front and rear wheeled frames is readily propelled and easily steered or guided in any desired direction through the swivelled or laterally swingable front wheels 23, by pushing or turning the front or forward end of the body 10 in the proper direction which will cause the front frame which is fixed to the body 10, to pivot or swing on the wheel forks 24 and permit the wheels to properly follow the direction of movement of the forward end of the vehicle, as will be readily understood.

The front wheel frame is braced and strengthened by a brace rod 26 extending centrally from the lower frame bar 20, and upwardly and rearwardly to the body or bed 10, and the rear wheel frame is strengthened by a similar brace rod 27 extending centrally from the lower frame bar 15, and forwardly and upwardly to the bed 10. The brace rods or bars 26 and 27 are secured to the under side of the bed 10 at the central portion thereof, and serve to prevent displacement or bending of the wheel frames from the bed by stresses applied thereto longitudinally of the vehicle.

The rear or seat bottom forming portion 11 of the vehicle body or bed 10 is provided with a seat back and side forming member 28. A confining and supporting member 32 of semi-circular form and preferably constructed from relatively stiff wire is detachably mounted on the upper forward ends of the seat member 28 and extends across the open forward side thereof, and a rubber or other suitable protecting cover 33, such as tubing or the like is placed over that portion of member 32 which is exposed in mounted position. At the forward end of the vehicle body or bed 10 a steering post or column 34 is vertically mounted extending through the reduced portion 12 of the bed to the rear of the front wheel frame, and depends downwardly a distance below the bed 10. The post 34 extends upwardly a distance above bed 10 and is provided at the upper end thereof with a cross bar or handle bar 40, in the usual manner familiar in this art.

The type of child's vehicle above described and illustrated in the accompanying drawings is generally used, as well as stored, indoors and to prevent damage to furniture, woodwork and the like, the invention provides an arrangement of protective elements at points on the vehicle liable to strike against adjacent objects. In order to prevent the forward end of the body 10 of the vehicle, and the front wheel frame thereof, from striking, a protective bumper F is mounted on the front wheel frame extending thereacross and projecting forwardly a distance beyond the frame and the forward end of the body or bed 10, as shown in Figs. 1 and 3. The front bumper F embodies a length of spring or resilient material such as spring wire or the like 41 slightly bowed and bent at the opposite ends into the hooks 42. A protective covering such as the relatively soft rubber tube 43 (see Fig. 5) is applied over and encloses the spring wire 41 to provide a non-damaging contact surface. The opposite sides of the members 21 of the front wheel frame are notched or cut out at 44 on their front and rear edges, as clearly shown in Fig. 5 of the accompanying drawings, and the bumper F is mounted on the front wheel frame by springing the opposite end hooks 42 over the sides of the frame members 21, respectively, and into the notches 44. The bumper F is held in mounted position extending across the front of the vehicle by the hooks 42 and the inherent resiliency or spring of the wire 41 from which it is formed.

A rear bumper R is detachably mounted and supported on the rear wheel frame and extends rearwardly between the rear wheels 19. The bumper R comprises a length of resilient or spring wire, or the like, 45 slightly bowed, and bent at the opposite ends to form the attaching arms 46. These arms 46 are offset or otherwise suitably formed on their inner sides to provide the seats or depressions 47, as shown in Fig. 3 of the drawings. The bumper R is provided with a suitable protective covering, such as the soft rubber tubing on bumper F, and is mounted on the rear wheel frame by springing the arms 46 toward each other and slipping the same between the opposite axle mounting members 16 of the rear frame, with the members 16 received in the seats 47 on the arms 46 and locking the bumper in mounted position. The bumper R is retained in mounted position by the construction as described, due to the spring or resiliency of the material from which formed and extends between the rear wheels 19 and projects a distance rearwardly beyond the rear end of the seat 11 of body 10.

The rear wheels 19 are provided with rubber tires T, and as the wheels 19 project rearwardly beyond the end of body 10, the rear end of the vehicle is therefore provided with protective elements formed by the bumper R and tires T, which will engage adjacent objects without injury and prevent either the rear wheel frame or the rear end of the body from striking and injuring any object. Similarly, the swivelled front wheels 23 are provided with tires T, which in cooperation with the front rubber covered bumper F prevent any injury from engagement by the front end of the vehicle.

The invention further eliminates damage by contact with the outwardly projecting ends of the rear axle 18, through the provision of relatively soft rubber caps S which are mounted over and cover the outer ends of the axles, as well as extending across the hubs of wheels 19. Thus, by the foregoing arrangement of front and rear bumpers F and R. and rubber caps S, in cooperation with the rubber tires T of the front and rear wheels, the vehicle in effect is protected by non-marring surfaces at all points thereon which will strike or engage adjacent objects, so that with a vehicle of this type used by a child indoors, all damage to furniture, woodwork and the like is practically eliminated. The construction and arrangement of the various elements provide a vehicle of the requisite strength to meet the severe requirements in use, while the elimination of damage to adjacent objects renders the vehicle of great utility for indoor use and storage.

It is evident that various changes, modifications, variations and substitutions might be resorted to without departing from the spirit and scope of the invention, and hence I do not desire to limit myself to the exact and specific disclosures hereof.

Desiring to protect my invention in the broadest manner legally possible, what I claim is:

1. In a child's vehicle, a wheeled frame, a protecting bumper embodying a length of spring material formed with opposite end frame engaging members, said bumper mounted and retained in position extending across the frame under tension by said end members engaging opposite sides, respectively, of the frame.

2. In a child's vehicle, a wheeled supporting frame, and a protecting bumper therefor embodying a length of spring wire enclosed within a relatively soft rubber tube and bent at its opposite ends to form frame engaging members, the said bumper attached in position extending across and outwardly from the frame by the said end members thereof engaged over the opposite sides of the frame.

3. In a child's vehicle, a body, a wheeled supporting frame for the body adjacent one end thereof, and a protecting bumper embodying a length of spring material bent at the opposite ends to form frame engaging hooks, the said bumper mounted and secured in position extending across the frame outwardly beyond the adjacent body end by the hooks engaged over opposite sides of the frame, respectively, said hooks extending over and around the frame sides to protect the same.

4. In a child's vehicle, a body, a wheeled frame adjacent one end of the body and including opposite side frame members, wheels mounted on opposite outer sides of said frame and extending beyond the adjacent body end, rubber tires on said wheels, and a rubber covered spring material bumper having the opposite ends thereof bent to form frame engaging members, said bumper being mounted on the frame and extending thereacross and outwardly beyond the adjacent body end between said wheels with the end members engaging the inner sides of the frame side members and the bumper being under tension to maintain the same in mounted position on the frame.

5. In combination, in a child's vehicle including a body and a rear wheel frame, an axle on said frame, wheels mounted on the opposite outer ends of said axle and extending rearwardly beyond the end of said body, rubber tires on said wheels, a rubber covered spring material bumper mounted upon and extending across the rear of said frame outwardly a distance beyond the adjacent body end and between said wheels, and rubber material protective caps mounted over the outer ends of said axle, respectively, the said caps with the rear axle and rubber tired wheels forming an assembly of protective members across the rear and at the sides of the vehicle preventing the same from damaging objects engaged thereby.

6. In combination, in a child's vehicle, a body, a front wheel frame at the forward end of the body and a rear wheel frame at the rear end of the body, an axle extending across said rear wheel frame, rear wheels mounted on the outer ends of said axle and extending rearwardly beyond the adjacent frame end, rubber tires on said rear wheels, front wheels mounted on said front frame and disposed therebelow, rubber tires on said front wheels, a rubber covered bumper mounted upon and extending across and rearwardly from said rear frame, outwardly beyond the adjacent body end and between said rear wheels, a rubber covered bumper mounted upon and extending across said front frame forwardly of the adjacent body end and around and over the opposite sides of the frame, and rubber caps mounted over and covering the outer projecting ends of said rear axle, respectively.

In testimony whereof I have hereunto set my hand at Cincinnati, Ohio, this 22nd day of July, 1925.

EMIL M. MAYER.